United States Patent [19]

Korbonits et al.

[11] 3,927,025

[45] Dec. 16, 1975

[54] 3-AMINO-$\Delta^2$-PYRAZOLINE DERIVATIVES AND PROCESS FOR THE PREPARATION THEREOF

[76] Inventors: Dezső Korbonits, 27d, Verhalom u., Budapest II; Kálmán Harsányi, 19-21, Egri J.u., Budapest XI; Erzsébet Molnár née Bakó, 58, Cservenka utca, Budapest XV; Kálmán Takács, 12, Vass u., Budapest VIII; Gergely Héja, 27, Sollner utca, Budapest XIII; János Bodnár, 17b, Menesi ut, Budapest XI; István Bodrogi, 36, Zoltan utca, Budapest XIX; Judit Erődi, 20/d, Hungaria korut, Budapest VIII, all of Hungary

[22] Filed: Jan. 7, 1972

[21] Appl. No.: 216,252

Related U.S. Application Data

[63] Continuation-in-part of Ser. No. 61,841, Aug. 6, 1970, abandoned.

[30] Foreign Application Priority Data

Aug. 7, 1969 Hungary................................ CI 913

[52] U.S. Cl. . 260/310 D; 260/295 AM; 260/296 R; 260/293.7; 260/307 G; 260/456 A; 260/464; 260/465.5 R; 260/465 E; 260/477; 260/490; 260/566 A; 260/566 AE; 424/263; 424/267; 424/273

[51] Int. Cl.$^2$........................................ C07D 231/06

[58] Field of Search ..... 260/310 D, 293.7, 295 AM, 260/296 R

[56] References Cited
FOREIGN PATENTS OR APPLICATIONS

| | | |
|---|---|---|
| 2,008,693 | 2/1970 | Germany |
| 727,030 | 1/1969 | Belgium |
| 679,678 | 9/1952 | United Kingdom |
| 194,097 | 9/1967 | U.S.S.R. |

OTHER PUBLICATIONS
Duffin et al., J. Chem. Soc., 1954, pp. 408 & 412.

Dann et al., C. A., Vol. 73, p. 14846z, 1970.

*Primary Examiner*—Sherman D. Winters
*Attorney, Agent, or Firm*—Hubbell, Cohen, & Stiefel

[57] ABSTRACT

There are disclosed compounds having the tautomeric formulae:

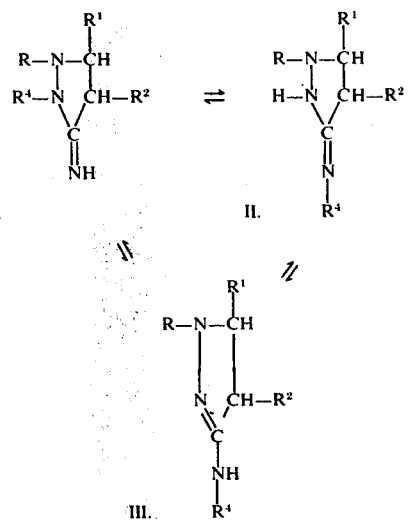

wherein R is an alkyl or substituted alkyl, cycloalkyl or substituted cycloalkyl, aralkyl or substituted aralkyl, or aryl or substituted aryl; $R^1$ and $R^2$ may each be hydrogen, an alkyl or substituted alkyl, aryl or substituted aryl; and $R^4$ is hydrogen or the acyl radical of an organic carboxylic acid; and salts thereof. A method of preparing said compounds is also disclosed. Said compounds are useful as pharmaceuticals, e.g., antispasmodics.

11 Claims, No Drawings

3-AMINO-Δ²-PYRAZOLINE DERIVATIVES AND PROCESS FOR THE PREPARATION THEREOF

CROSS-REFERENCES TO RELATED APPLICATIONS

This application is a continuation-in-part of application Ser. No. 61,841, filed Aug. 6, 1970, and now abandoned.

BACKGROUND OF THE INVENTION

1. Field of the Invention

This invention is directed to the preparation of substituted 3-amino-Δ²-pyrazoline derivatives. The majority of the compounds prepared according to said process are novel and the invention also relates to said new compounds.

2. Description of the Prior Art

It is known that 3-amino-Δ²-pyrazoline derivatives are useful in photography and pharmaceutical industry. Said compounds may be prepared according to prior art by a single method and some modifications thereof by subjecting β-cyanoethylhydrazines to intramolecular ring closure.

The known method is described in a number of publications and patent specifications, e.g., U.S. Pat. No. 2,726,248, British Patent Specification Nos. 776,322 and 679,678, Zsurn. Obscsej. Him. 26, 3132 (1956), 29, 498 (1959), Ann. Chim. (Roma) 56, 332 (1966), C.A. 65, 2244b., Chem. Ber. 98, 3377 (1965). (Chem. Soc./London/1954 408; 1955 3470.)

The common feature of the above procedures is that the $N_1$–$N_2$ bond of the pyrazoline-ring is formed prior to the last step of the synthesis. The process is, however, not completely unambiguous. In the case of reactions wherein aryl-hydrazines and acrylonitrile or derivatives thereof are used, both nitrogen atoms of the hydrazine group are reactive and, therefore, two simultaneous reactions may take place. Thus, the desired 1-aryl-3-amino-Δ²-pyrazoline-compounds may be contaminated by 1-aryl-5-amino-pyrazolines. The ratio of the two isomers may be influenced by the pH-value (Helv-Chim. Acta 41, 306/1958/: Ber. 98, 3357/1965/). In order to eliminate the twofold reaction possibilities the hydrazine group was formed in several cases by nitrozating and reducing the aryl-(2-cyanoethyl)-amine prepared by reacting an aromatic amine and acryl nitrile (British Patent Specification Nos. 757,840 and 776,322).

SUMMARY OF THE INVENTION

We have discovered a new process for the preparation of compounds having the three tautomeric formulae I, II, or III:

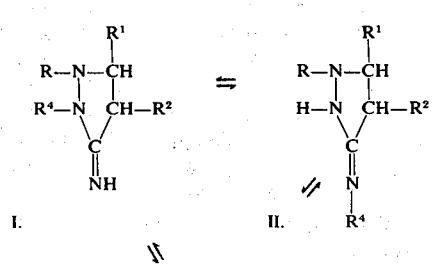

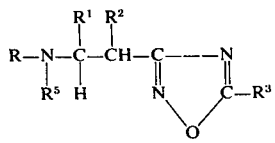

wherein R is an alkyl or substituted alkyl, cycloalkyl or substituted cycloalkyl, aralkyl or substituted aralkyl, aryl or substituted aryl; $R^1$ and $R^2$ are hydrogen, alkyl or substituted alkyl, aryl or substituted aryl; and $R^4$ is hydrogen or the acyl radical of an organic carboxylic acid; and salts thereof.

This process comprises:

a. treating a compound having the formula IV:

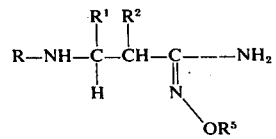

or a salt thereof (wherein R, $R^1$ and $R^2$ have the same meaning as stated above; $R^3$ is alkyl or substituted alkyl, aralkyl or substituted aralkyl, aryl or substituted aryl, and $R^5$ is hydrogen or acyl with a base; or b. forming the —N—N— bond of the molecule by eliminating a molecule having the formula $R^5$—OH from a compound having the formula V:

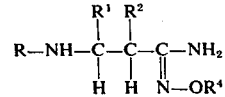

or salts thereof (wherein R, $R^1$ and $R^2$ have the same meaning as stated above and $R^5$ is hydrogen or an acyl radical; or c. reacting a compound having the formula VI:

or a salt thereof wherein R, $R^1$ and $R^2$ have the same meaning as stated above and $R^4$ is hydrogen or an acyl radical formed by the reaction of an organic carboxylic acid with an ester of the formula VII:

$$R^6 - O - R^7$$

VII wherein $R^6$ is an acyl radical of an organic carboxylic acid and $R^7$ is an alkyl group.

If desired, a compound having the formulae I, II or III, thus obtained, wherein $R^4$ is hydrogen, may be subjected to N-acylation. Alternatively, a compound having the formulae I, II or III, wherein $R^4$ is acyl, may be subjected to deacylation to yield a compound of the formulae I, II or III wherein $R^4$ is hydrogen. The product thus obtained may be further converted into a salt or if it is a salt, it may be set free from said salt.

As noted, the compounds of formulae I, II and III are tautomers. The present invention encompasses all the tautomeric forms and the preparation thereof.

Additionally, we have discovered a method for alleviating spasms comprising administering an effective amount of an antispasmodic agent comprising the compounds having the tautomeric formulae I, II or III, either alone or in conjunction with other pharmaceutical agents, e.g., carriers, excipients, etc.

DESCRIPTION OF THE PREFERRED EMBODIMENTS

In the formulae I–VII, suitable alkyl groups include straight or branched chained alkyl groups preferably having 1–7 carbon atoms, e.g., methyl, ethyl, propyl, isopropyl, isobutyl, etc. The alkyl groups may bear one or more substituents selected from the group consisting of halogen atoms, e.g., chlorine or bromine, amino, alkylamino, dialkylamino, nitro, hydroxy, and aryl, e.g., phenyl groups. Particularly suitable substituted alkyl groups for R are the diphenyl-alkyl groups.

The term "aryl group" in formulae I–VII may represent monocyclic or polycyclic aromatic radicals such as phenyl or naphthyl. The aryl ring may bear one or more substituents selected from the group consisting of halogen, e.g., chlorine or bromine, nitro, alkyl, e.g., methyl or ethyl, alkoxy, e.g., methoxy or ethoxy, amino, alkylamino and dialkylamino. The term aryl group encompasses also heteroaryl radicals, e.g., pyridyl.

The term "cycloalkyl group" as used in formulae I–VII preferably represent groups containing 3–6 carbon atoms, such as cyclopentyl or cyclohexyl.

The term "aralkyl group" as used in formulae I–VII preferably represent alkyl-groups having 1–5 carbon atoms substituted with an aromatic ring, e.g., benzyl or β-phenylethyl. The aryl moiety of the aralkyl group may bear one or more substituents specified above in the definition of the aryl groups.

When $R^4$ is the acyl radical of an organic carboxylic acid, the preferred acyl radicals are those derived from aliphatic carboxylic acids having 1–20 carbon atoms, aromatic carboxylic acids having 6–10 carbon atoms and substituted derivatives thereof, e.g., acetyl, propionyl, hydroxybenzoyl, benzoyl or β-piperidino-propionyl groups. The acyl radicals may be also derived from heterocyclic acids, such as nicotinic acid or isonicotinic acid.

Particularly useful compounds having the tautomeric formulae I, II or III, are those derivatives, wherein R is an alkyl group having 1–4 carbon atoms, a cycloalkyl group having 5–6 carbon atoms, a diphenyl-alkyl group, a nitrophenyl, methylphenyl, benzyl, dimethoxyphenethyl or phenyl group; $R^1$ and $R^2$ are hydrogen and $R^4$ is an acetyl, propionyl, hydroxybenzoyl or β-piperidino-propionyl group.

The salts of the compounds of the formula I may be acid addition salts formed with inorganic acids, e.g., hydrochloric acid, hydrobromic acid, sulfuric acid, nitric acid, etc., or organic acids, e.g., acetic acid, lactic acid, tartaric acid, maleic acid, fumaric acid, nicotinic acid, etc.

Particularly useful new compounds having the tautomeric formulae I, II or III, are the following:

1-(p-nitro-phenyl)-3-amino-$\Delta^2$-pyrazoline, 1-(3,3-diphenyl-propyl)-3-amino-$\Delta^2$-pyrazoline, 1-benzyl-3-amino-$\Delta^2$-pyrazoline, 1-[2-(3,4-dimethoxy-phenyl)ethyl]-3-amino-$\Delta^2$-pyrazoline, 1-cyclohexyl-3-amino-$\Delta^2$-pyrazoline, 1-n-butyl-3-amino-$\Delta^2$-pyrazoline.

Particularly useful new compounds of the present invention are:

The acetyl derivative of 1-(3,3-diphenyl-propyl)-3-amino-$\Delta^2$-pyrazoline, the β-piperidino-propionyl derivative of 1-(3,3-diphenyl-propyl)-3-amino-$\Delta^2$-pyrazoline, the salicyclic acid derivative of 1-(3,3-diphenyl)-propyl-3-amino$\Delta^2$-pyrazoline, the acetyl derivative of 1-benzyl-3-amino-$\Delta^2$-pyrazoline, the acetyl derivative of 1-[2-(3,4-dimethoxy-phenyl)-ethyl]-3-amino-$\Delta^2$-pyrazoline, the 1-cyclohexyl-3-amino-$\Delta^2$-2-pyrazoline-acetyl derivative, the acetyl derivative of 1-n-butyl-3-amino-$\Delta^2$-pyrazoline, and salts thereof.

According to method (a) of the process of the present invention, a compound of the formula IV or a salt thereof is treated with a base. The reaction is carried out preferably in the presence of water. Preferably, the reaction is carried out using an aqueous or aqueous-alcoholic alkali hydroxide, e.g., sodium hydroxide, or potassium hydroxide solution. Generally, the reaction may be carried out in aqueous medium or a mixture of water and an organic solvent in a heterogenous or homogenous system.

The reaction may, if desired, be carried out at elevated temperature.

According to method (b) of the process of the present invention, amidoximes of the formula V or salts thereof are subjected to a reaction in order to eliminate a $R^5$—OH molecule. When $R^5$ is an acyl radical, it may represent an alkanoyl radical, e.g., an alkanoyl radical containing 1–20 carbon atoms or a substituted derivative thereof, such as an acetyl or propionyl radical, an aroyl radical containing 6–20 carbon atoms or substituted derivatives thereof, such as benzoyl, an alkylsulfonyl radical, e.g., the mesyl group or an arylsulfonyl radical, e.g., the phenylsulfonyl or p-tosyl group.

The reaction is preferably carried out by heating the amidoxime of the formula V in an organic solvent with an acylating agent. Preferred acylating agents include acid anhydrides or acid chlorides such as acetic anhydride, benzoyl chloride, ethyl-chloro-formate, p-toluene-sulfonic acid chloride, etc.

According to method (c) of our process, a compound of the formula VI or a salt thereof is reacted with an ester of the formula VII. The reaction is carried out preferably in the presence of an alkali metal alcoholate or an alkali earth metal alcoholate. The reaction is carried out preferably at elevated temperature, most preferably between about 50° and 120°C. It is preferred to carry out the reaction in an alcoholic medium.

The compounds of the formulae I, II or III, thus obtained, wherein $R^4$ is hydrogen may be converted into the corresponding acyl derivatives. The N-acylation may be carried out by acylating methods well known in the art, preferably by using acid halides, e.g., acid chlorides, or acid anhydrides.

The compounds of the formulae I, II or III, wherein $R^4$ is acyl may be converted into the corresponding compounds, wherein $R^4$ is hydrogen, by means of deacylation methods well known in the art. Preferably, one may proceed by subjecting an acyl derivative of the formulae I, II or III, to a basic treatment. Alkali metal hydroxides, such as sodium hydroxide, are preferably used for this purpose and the reaction is preferably carried out in the presence of an organic solvent. Suitable organic solvents include the aliphatic alcohols, such as ethanol.

The oxidiazole-starting materials having formula IV (in which R is an aryl group) may be prepared by subjecting an amidoxime of the formula V, in which $R^5$ is hydrogen, to oxadiazolering closure. Suitable conditions for carrying out this reaction are described in British Pat. Specification No. 1,063,323.

The amidoxime starting materials of the formula V may be prepared in good yields by reacting a nitrile having the formula VIII:

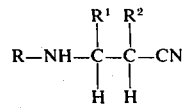

VIII.

wherein R, $R^1$ and $R^2$ have the same meaning as stated above, with hydroxylamine. The nitriles of the formula VIII themselves may be prepared by known methods, e.g., by reacting the corresponding amine with acrylonitrile or a β-halonitrile with an amine.

The compounds of the formulae I, II or III, thus obtained, wherein $R^4$ is hydrogen may be subjected to N-acylation. The reaction is carried out by well known methods, preferably by using acid halides. Compounds having the formulae I, II or III are obtained, wherein $R^4$ is an acyl radical of an organic carboxylic acid.

The compounds having the formulae I, II or III, thus obtained, may be converted into their inorganic or organic salts by reaction with the corresponding inorganic or organic acid. Salt formation may be carried out by methods well known in the art, preferably, by reacting a compound having the formulae I, II or III in the presence of an organic solvent with an equivalent amount of the corresponding acid.

Using the process of the present invention, valuable 3-amino-$\Delta^2$pyrazoline derivatives may be easily prepared on an industrial scale. The process differs fundamentally from known procedures because the $N_1$-$N_2$-bond of the pyrazoline ring is formed during the last cyclization step.

Compounds having the tautomeric formulae I, II or III, both those which are known compounds and those which are novel, are antispasmodic agents when administered in an effective amount to a mammal. By an effective amount is meant that amount required to control the spasmodic condition being treated. Understandably, the amount required in terms of medical dosage and the period of time over which such dosage is administered is easily determined and may vary depending on the severity of the condition. Additionally, the compounds having the tautomeric formulae I, II or III exhibit negligible toxicity.

For humans, the preferred daily dosage is in the range from about 2 to 8 mg/kg. Generally, at a daily dosage of 4 mg/kg, marked antispasmodic effects are effected within 1 day. The daily dosage may generally be administered in units of 50 to 100 milligrams, 3-times a day.

Generally, the dosage for large mammals is preferably in the range from about 20 to 40 per kg. of the mammal.

With regard to the toxicity, for example, the $LD_{50}$ value of 1-(3,3-diphenyl-propyl)-3amino-$\Delta^2$-pyrazoline on mice is greater than 500 mg/kg p.o. (500 mg/kg does not cause death.)

The $ED_{50}$ in mice, which partially inhibits the electroshock spasm (prevents the tonic extension of the hind legs), is 30 mg/kg and the $ED_{50}$ which entirely prevents the generalized clonospasm is 40 mg/kg p.o. and 17 mg/kg s.c.

With regard to nicotine toxicity inhibition, the $ED_{50}$ which prevents death otherwise caused by the i.v. administered $LD_{100}$ amount of nicotine is 29.5 mg/kg p.o.

The compounds having the formulae I, II or III, or salts thereof may thus be administered either alone or in admixture with suitable inert solid or liquid carriers and/or excipients. Suitable carriers include chalk, starch, potassium carbonate, magnesium carbonate, magnesium sulfate, polyethylenglycols, water, etc. The compositions may be finished in solid form, e.g., tablets, pills, coated pills, capsules, or liquid, e.g., suspensions, emulsions, or injectable preparation form. Such compositions may be prepared by methods well known in the pharmaceutical arts.

In formulations with solid carriers it is preferred that the total amount of active compound, i.e., the compound having the tautomeric formulae I, II or III per unit dose, i.e., per tablet, pill or capsule, be in the range from 25 to 75 milligrams, and that the ratio of inert carrier material to the active component be in the range from about 5:1 to 10:1. In formulations with liquid carriers, it is preferred that the amounts of active components per unit, i.e., per injection or per cc of suspension or emulsion, be in the range of from about 2 milligrams to 50 milligrams and that the ratio of liquid carrier to active component be in the range from about 50:1 to 15:1.

The following illustrate typical formulations of the present compounds in tablet and capsule form.

| Tablets | |
|---|---:|
| 1-(3,3-diphenyl-propyl)-3-amino-$\Delta^2$-pyrazoline | 50 mg |
| Corn starch | 125 mg |
| Calcium phosphate | 270 mg |
| Magnesium stearate | 1 mg |
| Total: | 466 mg |
| Capsules | |
| 1-(3,3-diphenyl-propyl)-3-amino-$\Delta^2$-pyrazoline | 25 mg |
| Lactose | 155 mg |
| Corn starch | 30 mg |
| Talc | 5 mg |
| Total: | 215 mg |

Some compounds having the formulae I, II or III, are useful in photography as photographic developers.

The following Examples further illustrate our invention:

EXAMPLE I

A mixture of 2.03 g (0.01 Mole) of 3-(2-phenylaminoethyl)-5-methyl-1,2,4-oxadiazole, 20 ml of 1 N aqueous sodium hydroxide solution and 20 ml of 96% ethanol was heated on a water bath for 3 hours. The alcohol was distilled off in vacuo and the aqueous residue was cooled. 1.21 g of faint rust-colored 1-phenyl-3-amino-$\Delta^2$-2-pyrazoline were obtained. Yield: 75%. The crystalline product melts at 165°–168°C. After recrystallization from ethanol, the melting point rises to 169°C. The product thus obtained proved to be identical in every respect with the compound prepared according to the known process described in J. Chem. Soc. (London) 1954, 408.

EXAMPLE 2

1 g of 3-[2-(3,3-diphenyl-propyl-acetyl-amino)-ethyl]-5-methyl-1,2,4-oxadiazole was refluxed with 10 ml of 2 N sodium hydroxide solution and 10 ml of 96% ethanol for 8 hours. The alcohol was distilled off, the separated oil was extracted from the aqueous phase with chloroform, and then dried and evaporated. The residual oil was treated with a mixture of benzene and petrolether. The melting point of the 1-(3,3-diphenyl-propyl)-3-amino-$\Delta^2$-pyrazoline was 150°C. The product is identical with the compound prepared in Example 15.

The starting material used was prepared as follows:

50 g (0.189 Mole) of 3-(3,3-diphenyl-propyl)-amino-propionitrile were dissolved in 100 ml of acetic anhydride. The reaction mixture was heated on a water bath for an hour. It was then cooled and poured onto 500 g of ice. The oily product became crystalline on scratching. The crystals were filtered by suction, washed with water and dried. 53.30 g of 3-(3,3-diphenyl-propyl-acetyl)-amino-propionitrile were obtained. Yield: 91.7%. M.p.: 108°–109°C. On recrystallization from 96% ethanol the melting point rose to 109°–110°C.

53.30 g (0.173 Mole) of the nitrile thus obtained were reacted with hydroxylamine as described in Example 12. 60 g of an oily product were obtained. The substance was purified by forming the hydrochloride thereof. 41.30 g of 3-(3,3-diphenylpropyl-acetyl)-amino-propionic acid amidoxime were obtained. M.p.: 125°–130°C. On recrystallization from benzene the melting point rose to 130°–132°C. Yield: 70.5%.

6.76 g (0.02 Mole) of the amidoxime thus obtained were reacted with ethyl acetate as described in Example 7. 5.90 g of 3-[2-(3,3-diphenyl-propyl-acetyl-amino)-ethyl]-5-methyl-1,2,4-oxadiazole were obtained. Yield: 80%. M.p.: 70°–75°C. On recrystallization from cyclohexane, the melting point rose to 85°C.

10 g of 3-(3,3-diphenyl-propyl)-amino-propionic acid amidoxime were dissolved in 20 ml of acetic anhydride. The reaction mixture was allowed to stand for an hour, whereupon it was poured onto 100 g of ice. The precipitated crystals were filtered by suction and washed with water. 12.15 g of O-acetyl-3-(3,3-diphenyl-propyl-acetyl-amino)-propionic acid amidoxime were obtained. M.p.: 129°–142°C. On recrystallization from ethyl acetate, the melting point rose to 145°C.

12 g of the above acyl compound were admixed with 50 ml of pyridine and refluxed for 4 hours. After evaporation, 11.30 g of crystalline 3-[2-(3,3-diphenyl-propyl-acetyl-amino)-ethyl]-5-methyl-1,2,4-oxadiazole were obtained. M.p.: 65°–70°C. After recrystallization from cyclohexane, the melting point rose to 85°C.

EXAMPLES 3–5

The following compounds were prepared according to Example 1. The starting materials, the end products and the melting points of the compounds obtained are summarized in Table I:

TABLE I

| Example No. | Starting Material (IV) | End-Products (Formulae I, II or III) | M.p. °C |
|---|---|---|---|
| 3. | 3-(2-p-methyl-anilino-ethyl)-5-methyl-1,2,4-oxadiazole | 1-(p-tolyl)-3-amino-$\Delta^2$-pyrazoline | 130–132 (from water) |
| 4. | 3-(2-anilino-ethyl)-5-phenyl-1,2,4-oxadiazole | 1-phenyl-3-amino-$\Delta^2$-pyrazoline | 165–168 (from 96% ethanol) |
| 5. | 3-(2-p-methyl-anilino-ethyl)-5-phenyl-1,2,4-oxadiazole | 1-(p-methyl-phenyl)-3-amino-$\Delta^2$-pyrazoline | 30–132 (from water) |

EXAMPLE 6

1.79 g (0.01 Mole) of β-phenylamino-propionic acid amidoxime were dissolved in 10 ml of pyridine, whereupon 2.1 g of p-toluene-sulfonic acid chloride were added under stirring and cooling in such a manner to maintain the temperature below 20°C. The reaction mixture was heated on a water bath for 3 hours, after which the pyridine was evaporated in vacuo. The residue was admixed with 4 ml of N aqueous sodium hydroxide solution and 5 ml of 96% ethanol. The precipitated crystalline product was filtered by suction and washed with water until neutral. After recrystallization from ethanol, 1.06 g of 1-phenyl-3-amino-$\Delta^2$-pyrazoline were obtained. Yield: 66%. M.p.: 168°–169°C.

EXAMPLE 7

7.16 g (0.04 Mole) of β-phenylamino-propionic acid amidoxime and 10.6 g (0.12 Mole) of ethyl acetate were dissolved in 140 ml of anhydrous ethanol. This solution was then added to a sodium ethylate solution prepared from 0.92 g of sodium metal and 60 ml of anhydrous ethanol. The reaction mixture was boiled for 8 hours, whereupon crystals precipitated and a brown coloration was observed. The alcohol was removed in vacuo and 100 ml of water were added to the residue. An oily product was separated from the water, which became crystalline on scratching. The crystals were filtered by suction, washed throughly with water and dried. 7.5 g of a pink substance were obtained. M.p.: 50°–54°C. On extraction with petrolether, 6.2 g of faint, rust-colored, 3-(2-phenylaminoethyl)-5-methyl-1,2,4-oxadiazole were obtained. M.p.: 55°–57°C. Yield: 76.5%.

Analysis: Calc. for the formula $C_{11}H_{13}N_3O$: C, 65.04; H, 6.45; N, 20.68. Found: C, 65.26; H, 6.48; N, 20.67.

EXAMPLES 8–11

The following compounds were prepared in accordance with the process described in Example 7. The starting materials, the end-products, and the melting points thereof are summarized in Table II.

TABLE II

| Example No. | Amidoxime of formula VI | Ester of formula VII | End-Product of formula IV | M.p. °C |
|---|---|---|---|---|
| 8 | 3-p-nitro-anilino-propionic acid amidoxime | ethyl acetate | 3-(2-p-nitro-anilino-ethyl)-5-methyl-1,2,4-oxadiazole | 138–140 (from anhydrous ethanol) |
| 9 | 3-(p-toluidino)-propionic acid amidoxime oxime | ethyl acetate | 3-(2-p-methylanilino-ethyl)-5-methyl-1,2,4-oxidiazole | 62 (from petrolether) |
| 10 | 3-anilino-propionic acid amidoxime | ethyl benzoate | 3-(2-anilino-ethyl)-5-phenyl-1,2,4-oxidiazole | 83–85 (from a mixture of ethyl acetate and petrolether) |
| 11 | 3-(p-methyl-anilino)-propionic acid amidoxime | ethyl benzoate | 3-(2-p-methyl-anilino-ethyl)-5-phenyl-1,2,4-oxadiazole | 72 (from cyclohexane) |

EXAMPLE 12

26.5 g (0.182 Mole) of β-phenylamino-propionitrile were dissolved in 150 ml of ethanol, whereupon a solution of 28.6 g of hydroxylamine hydrochloride, 30.4 g of sodium hydrogen carbonate and 50 ml of water were added. The reaction mixture was refluxed for 8 hours. The alcohol was distilled off and 200 ml of water were added to the residue. On scratching, an oily product was formed, which soon became crystalline. 26.2 g of β-phenylamino-propionic acid amidoxime were obtained. Yield: 80%. The melting point was 88°–92°C and did not change after recrystallization from a 1:1 mixture of ethyl acetate and petrol ether.

Analysis: Calc. for the formula $C_9H_{13}N_3O$: C, 60.30; H, 7.32; N, 23.45. Found: C, 60.6; H, 7.43; N, 23.7.

EXAMPLES 13 and 14

The following compounds were prepared according to the process described in Example 12. The starting materials, products and product melting points are set out in Table III:

TABLE III

| Example No. | Nitrile of the formula VIII | Amidoxime of the formula IV | M.p. °C |
|---|---|---|---|
| 13 | 3-(p-nitro-anilino)-propionitrile | 3-(p-nitro-anilino)-propionic acid amidoxime | 130–135 (from water) |
| 14 | 3-(p-nitro-anilino)-propionitrile | 3-(p-methyl-anilino)-propionic acid amidoxime | 100 (from ethyl acetate) |

EXAMPLE 15

A mixture of 1.99 g (0.0062 Mole) of 1-(3,3-diphenylpropyl)-3-amino-$\Delta^2$-pyrazoline acetyl-derivative, 20 ml of N aqueous sodium hydroxide solution and 20 ml of 96% ethanol were heated at boiling for 3 hours. The clear yellow solution was cooled and the precipitated needle crystals were filtered by suction, washed with water until neutral and dried under an infrared lamp. 1.61 g of 1-(3,3-diphenyl-propyl)-3-amino-$\Delta^2$-pyrazoline were obtained. Yield: 92%. M.p.: 159°–161°C. After recrystallization, the melting point rose to 163°–165°C.

Analysis: Calc. for the formula $C_{18}H_{21}N_3$: C, 77.37; H, 7.50; N, 15.13. Found: C, 77.17; H, 7.42; N, 15.34.

The base was converted into the dihydrochloride using ethanol containing hydrochloric acid. The hydrochloride had a melting point of 160°C, which remained unchanged after crystallization from ethanol containing hydrochloric acid.

Analysis: Calc. for the formula $C_{18}H_{23}N_3Cl_2$: Cl, 20.10; C, 61.40; H, 6.58; N, 11.92. Found: Cl, 20.33; C, 61.54; H, 6.50; N, 11.86.

EXAMPLES 16–20

The following compounds were prepared according to the process described in Example 15. The starting materials, products and product melting points are set out in Table IV:

TABLE IV

| Example No. | Acyl-derivative of formulae I, II or III | Amino-derivative of the formulae I, II or III | M.p. °C |
|---|---|---|---|
| 16 | β-piperidino-propionyl-derivative of 1-(3,3-diphenyl-propyl)-3-amino-$\Delta^2$-pyrazoline | 1-(3,3-diphenyl-propyl)-3-amino-$\Delta^2$-pyrazoline | 163–165 (from 96% ethanol) |
| 17 | Acetyl-derivative of 1-benzyl-3-amino-$\Delta^2$-pyrazoline | 1-benxyl-3-amino-$\Delta^2$-pyrazoline | 73–80 (from cyclohexane); hydrochloride 238-(from anhydrous ethanol) |
| 18 | Acetyl-derivative of 1-[2-(3,4-dimethoxyphenyl)-ethyl]-3-amino-$\Delta^2$pyrazoline | 1-[2-(3,4-dimethoxy-phenyl)-ethyl]-3-amino-$\Delta^2$-pyrazoline | 158–160 (from ethyl acetate); hydrochloride 182–185 (from 96% ethanol) |
| 19 | Acetyl-derivative of 1-cyclo-hexyl-3- | 1-cyclohexyl-3-amino-$\Delta^2$-pyra- | 86–88 (from cyclohexane); |

TABLE IV-continued

| Example No. | Acyl-derivative of formula I, II or III | Amino-derivative of the formulae I, II or III | M.p. °C |
|---|---|---|---|
|  | amino-Δ²-pyrazoline | zoline | hydrochloride 233 (from anhydrous ethanol) |
| 20 | Acetyl-derivative of 1-n-butyl-3-amino-Δ²-pyrazoline | 1-n-butyl-3-amino-Δ²-pyrazoline | 65–70 (from petrol ether); hydrochloride 147 (from anhydrous ethanol) |

EXAMPLE 21

24 g (0.08 Mole) of β-(3,3-diphenyl-propylamino)-propionic acid amidoxime are admixed with a solution of 19.92 g of ethyl acetate (0.24 Mole) and 350 ml of anhydrous ethanol and the hot mixture was poured into a sodium ethylate solution prepared from 1.84 g of sodium and 50 ml of anhydrous ethanol. The reaction mixture was boiled for 8 hours, whereupon the alcohol was distilled off, 200 ml of water were added to the residue and the mixture was extracted with chloroform. The extract was dried and evaporated. 20 ml of ethanol were added to the residual yellow oil (21.6 g). 1.7 g of the amidoxime starting material precipitated in the form of crystals (M.p.: 157°–160°C). On standing, an additional amount of the amidoxime starting material precipitated from the aqueous phase (4.15 g); M.p.: 157°–160°C. The alcoholic filtrate was evaporated in vacuo. The residual resinous product became crystalline on scratching. 19.3 g of the 1-(3,3-diphenyl-propyl)-3-amino-Δ²-pyrazoline-acetyl-derivative were obtained. Yield: 75%. M.p.: 88°–92°C.

EXAMPLES 22–27

The following compounds were prepared according to the process described in Example 21. The starting materials, products and product melting points are set forth in Table V:

TABLE V

| Example No. | Starting Material | Starting ester of the formula VII | End-Products of the formulae I, II or III | M.p. °C |
|---|---|---|---|---|
| 22 | 3-(3,3-diphenyl-propyl)-amino-propionic acid amidoxime | β-piperidino-propionic acid ethyl ester | β-piperidino propionyl-derivative of 1-(3,3-diphenyl-propyl)-3-amino-Δ²-pyrazoline | 119–120 (ethyl acetate-petrol-ether) |
| 23 | 3-(3,3-diphenyl-propyl)-amino-propionic acid-amidoxime | Salicyclic acid ethyl ester | Salicyclic acid derivative of 1-(3,3-diphenyl)-propyl-3-amino-Δ²-pyrazoline | 178 (from isopropanol) |
| 24 | 3-benzylamino-propionic acid amidoxime | Ethyl acetate | Acetyl-derivative of 1-benzyl-3-amino-Δ²-pyrazoline | 145 (from benzene-cyclohexane |
| 25 | 3-[2-(3,4-dimethoxy-phenyl)-ethyl]-amino-propionic acid amidoxime | Ethyl acetate | Acetyl-derivative of 1-[2-(3,4-dimethoxy-phenyl)-ethyl]-3-amino-Δ²-pyrazoline | 115 (from ethyl acetate |
| 26 | 3-cyclohexyl-amino-propionic acid amidoxime | Ethyl acetate | 1-cyclohexyl-3-amino-Δ²-2-pyrazoline acetyl-derivative | 130–132 (from ethyl acetate-petrol-ether) |
| 27 | 3-n-butylamino-propionic acid | Ethyl acetate | Acetyl-derivative 1-n-butyl-3-amino-Δ²-pyrazoline | 63–65 (from petrol ether) |

EXAMPLE 28

26.44 g (0.1 Mole) of β-(3,3-diphenyl-propylamino)-propionitrile were dissolved in 100 ml of ethanol. A solution of 14 g of hydroxylamine hydrochloride, 16.8 g of sodium hydrogen carbonate and 50 ml of water were added. The reaction mixture was boiled on a water bath for 4 hours. The alcohol was distilled off in vacuo, the aqueous residue was admixed with 200 ml of water, the precipitated product was filtered, washed with water and dried. 29 g of crude β-(3,3-diphenyl-propylamino)-propionic acid amidoxime were obtained. Yield: 97%. M.p.: 155°–158°C. The crude product may be further reacted without purification. On recrystallization from ethanol, the melting point rose to 158°–160°C.

Analysis: Calc. for the formula $C_{18}H_{23}N_3O$: N, 14.13. Found: N, 13.97.

The base may be converted into the dihydrochloride with the aid of ethanol containing hydrochloric acid (M.p.: 209°–211°C).

Analysis: Calc. for the formula $C_{18}H_{25}Cl_2N_3O$: C, 58.40; H, 6.81; N, 11.35; Cl, 19.15. Found: C, 58.42; H, 7.00; N, 11.17; Cl, 19.02.

EXAMPLES 29-32

The following compounds were prepared according to the process described in Example 28. The starting materials, products and product melting points are set out in Table VI:

TABLE VI

| Example No. | Starting Material Nitrile of the formula VIII | Prepared Amidoxime of the formula V | M.p. °C |
|---|---|---|---|
| 29 | 3-[2-(3,4-dimethoxy-phenyl)-ethyl]-amino-propionitrile | 3-[2-(3,4-dimethoxy-phenyl)-ethyl]-amino-propionic acid amidoxime | 108–110 (from ethyl acetate) |
| 30 | 3-benzylamino-propionitrile | 3-benzylamino-propionic acid amidoxime | hydrochloride 167-(from 96% ethanol) |
| 31 | 3-cyclohexylamino-propionitrile | 3-cyclohexylamino-propionic acid amidoxime | 119 (from water) |
| 32 | 3-n-butylamino-propionitrile | 3-n-butylamino-propionic acid amidoxime | 82–85 (from ethyl acetate-petrol ether) |

EXAMPLE 33

To 211.3 g (1.0 Mole) of 3,3-diphenyl-propylamine, 53.1 g (1.0 Mole) of acryl nitrile were added under stirring and cooling with water over a period of about 1 hour. The solution was then heated on a water bath for about 8 hours. The thick solution obtained (264 g) was cooled. On scratching, β-(3,3-diphenylpropylamino)-propionitrile was obtained in good yields. M.p.: 54°C. B.p.: 195°–197°C/0.1 mm Hg. The crude nitrile may be used for further reaction without purification.

Analysis: Calc. for the formula $C_{18}H_{20}N_2$: C, 82.10; H, 7.67; N, 10.64. Found: C, 81.96; H, 7.44; N, 10.56.

EXAMPLE 34

2.79 g (0.01 Mole) of β-(3,3-diphenyl-propylamino)-propionic acid amidoxime were dissolved in 15 ml of anhydrous pyridine. 2.1 g (0.011 Mole) of p-toluene-sulfonic acid chloride were added at room temperature under stirring and cooling with the dropwise addition of water. After the addition, the reaction mixture was heated on a water bath for 3 hours. The pyridine was distilled off in vacuo. The residue was admixed with a mixture of 10 ml of 1 N sodium hydroxide solution and 5 ml of 96% ethanol. The precipitated crystals were filtered, washed with water and dried. 2.0 g of 1-(3,3-diphenyl-propyl)-3-amino-$\Delta^2$-pyrazoline were obtained. Yield: 72%. M.p.: 159°–161°C.

Variations can, of course, be made without departing from the spirit and scope of this invention.

Having thus described our invention, what we desire to secure by Letters Patent and hereby claim is:

1. A process for preparing a compound having the tautomeric formulae:

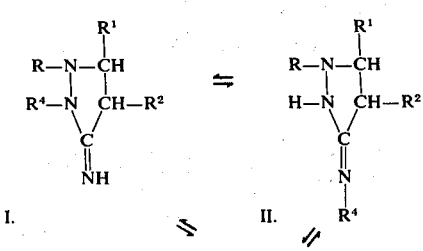

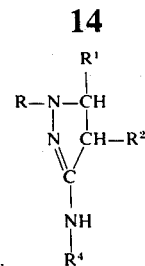

wherein R is a $C_1$–$C_7$ alkyl or a $C_1$–$C_7$ alkyl substituted with at least one member of the group consisting of halogen, amino, nitro, hydroxy, $C_1$–$C_7$ alkylamino, $C_1$–$C_7$ dialkyl amino and phenyl; a $C_3$–$C_6$ cycloalkyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; an aralkyl group wherein the alkyl moiety has 1 to 5 carbon atoms and the aryl moiety is as defined above; $R^1$ and $R^2$ may each be hydrogen, a $C_1$–$C_7$ alkyl or a $C_1$–$C_7$ alkyl substituted with at least one member of the group consisting of halogen, amino, nitro, hydroxy, $C_1$–$C_7$ alkylamino, $C_1$–$C_7$ dialkyl amino and phenyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; and $R^4$ is hydrogen, an acyl radical of an aliphatic organic carboxylic acid having 1–20 carbon atoms or an aromatic carboxylic acid having 6–10 carbon atoms; and salts thereof, which process comprises reacting a compound having the formula IV:

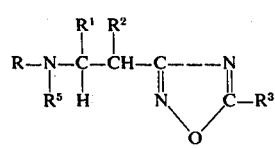

or a salt thereof wherein R, $R^1$ and $R^2$ have the same meaning as stated above; $R^3$ is a $C_1$–$C_7$ alkyl group or a $C_1$–$C_7$ alkyl substituted with at least one member of the group consisting of halogen, amino, nitro, hydroxy, $C_1$–$C_7$ alkylamino, $C_1$–$C_7$ dialkylamino and phenyl; an aryl group group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; an aralkyl group wherein the alkyl moiety has 1 to 5 carbon atoms and the aryl moiety is as defined above; and $R^5$ is hydrogen or an acyl group selected from the group consisting of $C_1$–$C_{20}$ alkanoyl, $C_6$–$C_{20}$ aroyl, $C_1$–$C_7$ alkylsulfonyl, and arylsulfonyl wherein the aryl is phenyl, naphthyl or pyridyl, with a base.

2. The process of claim 1 wherein the base is selected from the group consisting of aqueous alkali hydroxide and aqueous-alcoholic alkali-hydroxide, and the reaction is carried out at elevated temperatures.

3. A process for preparing a compound having the tautomeric formulae:

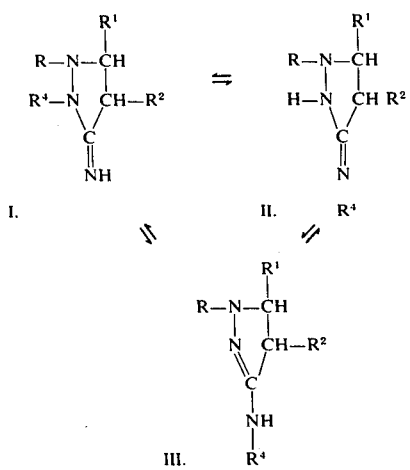

wherein R is a $C_1$–$C_7$ alkyl or a $C_1$–$C_7$ alkyl substituted with at least one member of the group consisting of halogen, amino, nitro, hydroxy, $C_1$–$C_7$ alkylamino, $C_1$–$C_7$ dialkyl amino and phenyl; a $C_3$–$C_6$ cycloalkyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; an aralkyl group wherein the alkyl moiety has 1 to 5 carbon atoms and the aryl moiety is as defined above; $R^1$ and $R^2$ may each be hydrogen, a $C_1$–$C_7$ alkyl or a $C_1$–$C_7$ alkyl substituted with at least one member of the group consisting of halogen, amino, nitro, hydroxy, $C_1$–$C_7$ alkylamino, $C_1$–$C_7$ dialkyl amino and phenyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; and $R^4$ is hydrogen, an acyl radical of an aliphatic organic carboxylic acid having 1–20 carbon atoms or an aromatic carboxylic acid having 6–10 carbon atoms; and salts thereof, which process comprises heating a compound having the formula V:

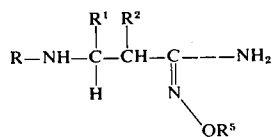

V.

or a salt thereof wherein R, $R^1$ and $R^2$ have the same meaning as stated above and $R^5$ is hydrogen or an acyl radical with an acylating agent to eliminate a molecule having the formula $R^5$—OH and thereby form the —N—N— bond.

4. The process of claim 3 wherein the heating is carried out in an organic solvent.

5. The process of claim 3 wherein the acylating agent is an acid anhydride or an acyl halide.

6. A process for preparing a compound having the tautomeric formulae:

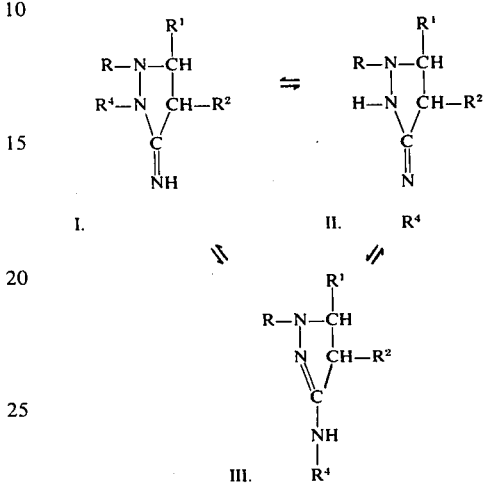

wherein R is a $C_1$–$C_7$ alkyl or a $C_1$–$C_7$ alkyl substituted with at least one member of the group consisting of halogen, amino, nitro, hydroxy, $C_1$–$C_7$ alkylamino, $C_1$–$C_7$ dialkyl amino and phenyl; a $C_3$–$C_6$ cycloalkyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; an aralkyl group wherein the alkyl moiety has 1 to 5 carbon atoms and the aryl moiety is as defined above; $R^1$ and $R^2$ may each be hydrogen, a $C_1$–$C_7$ alkyl or a $C_1$–$C_7$ alkyl, substituted with at least one member of the group consisting of halogen, amino, nitro, hydroxy, $C_1$–$C_7$ alkylamino, $C_1$–$C_7$ dialkyl amino and phenyl; an aryl group selected from the group consisting of phenyl, naphthyl and pyridyl or said aryl group substituted with a member selected from the group consisting of halogen, amino, nitro, $C_1$–$C_7$ alkyl, alkoxy, alkylamino and dialkylamino; and $R^4$ is hydrogen, an acyl radical of an aliphatic organic carboxylic acid; and salts thereof, which process comprises reacting a compound having the formula VI:

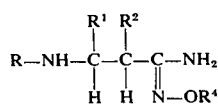

VI.

or a salt thereof wherein R, $R^1$ and $R^2$ have the same meaning as stated above and $R^4$ is hydrogen or an acyl radical formed by the reaction of an organic carboxylic acid with an ester of the formula VII:

VII.

wherein $R^6$ is an acyl radical of an aliphatic organic carboxylic acid having 1 to 20 carbon atoms or an aromatic carboxylic acid having 6–10 carbon atoms and $R^7$ is $C_1$–$C_7$ alkyl group.

7. The process of claim 6 wherein the reaction is carried out in the presence of an alkali metal alcoholate or an alkali earth metal alcoholate and wherein the temperature is in the range from about 50° to 120°C.

8. A compound having the tautomeric formulae:

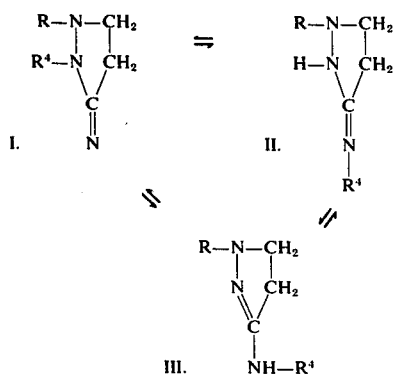

wherein R is an alkyl group having 1–4 carbon atoms, a cycloalkyl group having 5–6 carbon atoms, a diphenylpropyl group, a nitrophenyl, methyl-phenyl, benzyl, dimethoxyphenethyl or phenyl group; and $R^4$ is an acetyl, propionyl, hydroxybenzoyl or β-piperidinopropionyl group or a salt thereof with an inorganic acid selected from the group consisting of hydrochloric acid, hydrobromic acid, sulfuric acid and nitric acid or an organic acid selected from the group consisting of acetic acid, lactic acid, tartaric acid, maleic acid, fumaric acid and nicotinic acid.

9. 1-(3,3-diphenyl-n-propyl)-3-amino-$\Delta^2$-pyrazoline.

10. 1-[-2-(3,4-dimethoxyphenyl)-ethyl]-3-amino-$\Delta^2$-pyrazoline.

11. The compound of claim 8 selected from the group consisting of 1-(3,3-diphenyl-n-propyl)-3-acetamido-$\Delta^2$-pyrazoline, 1-(3,3-diphenyl-n-propyl)-3-β-piperidinopropionamido-$\Delta^2$-pyrazoline, 1-(3,3-diphenyl-n-propyl)-3-salicylamido-$\Delta^2$-pyrazoline, 1-benzyl-3-acetamido-$\Delta^2$-pyrazoline, 1-[2-(3,4-dimethoxy-phenyl)-ethyl]-3-acetamido-$\Delta^2$-pyrazoline, 1-cyclohexyl-3-acetamido-$\Delta^2$-pyrazoline and 1-n-butyl-3-acetamido-$\Delta^2$-pyrazoline.

* * * * *

UNITED STATES PATENT OFFICE
CERTIFICATE OF CORRECTION

Patent No. 3,927,025                    Dated   December 16, 1975

Inventor(s)  DEZSO KORBONITS et al

It is certified that error appears in the above-identified patent and that said Letters Patent are hereby corrected as shown below:

Column 3, line 28: "aryl group" should read -- "aryl group".

Column 5, line 2: "oxadiazolering" should read -- oxadiazole-ring --.

Column 6, line 40: "Total: 466 mg." should read -- Total: 446 mg. --.

Columns 7-8, column 4 of Table I: "30-132" should read -- 130-132 --.

Column 8, line 55: "throughly" should read -- thoroughly --.

Columns 9-10, column 3 of Table IV: "1-benxyl-" should read -- 1-benzyl- --.

Column 14, line 65: "group group" should read -- group --.

Column 15, lines 15-22:

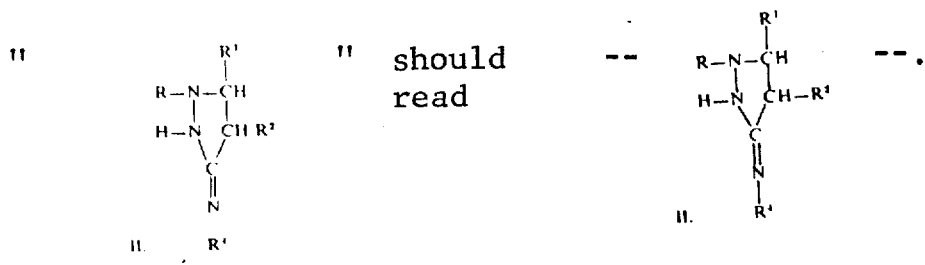

UNITED STATES PATENT OFFICE
CERTIFICATE OF CORRECTION

Patent No. 3,927,025      Dated December 16, 1975

Inventor(s) DEZSO KORBONITS et al

It is certified that error appears in the above-identified patent and that said Letters Patent are hereby corrected as shown below:

Column 16, lines 10-17:

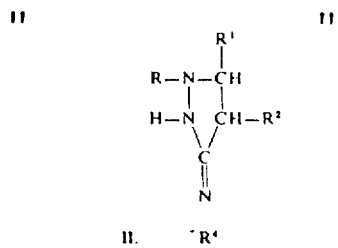 should read 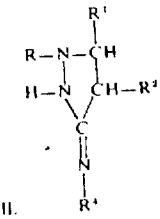

Signed and Sealed this eighteenth Day of May 1976

[SEAL]

Attest:

RUTH C. MASON  
Attesting Officer

C. MARSHALL DANN  
Commissioner of Patents and Trademarks